No. 633,528. Patented Sept. 19, 1899.
W. L. MORRIS.
TREE OR PLANT PROTECTOR.
(Application filed Apr. 1, 1899.)
(No Model.)
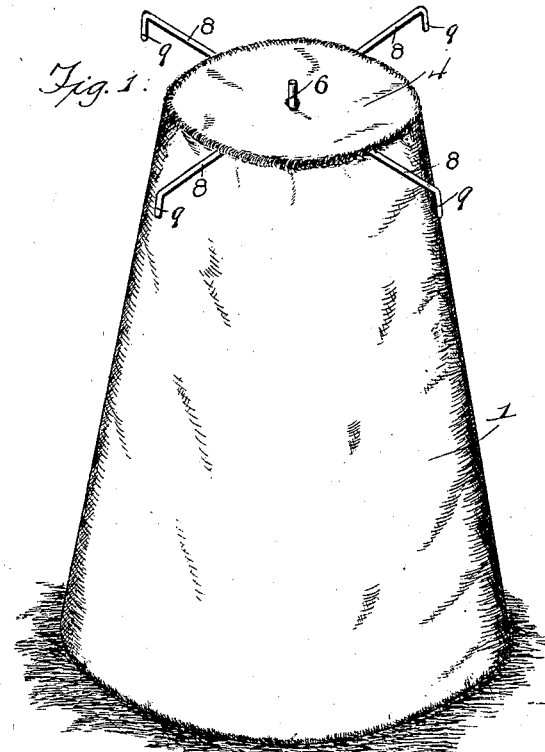
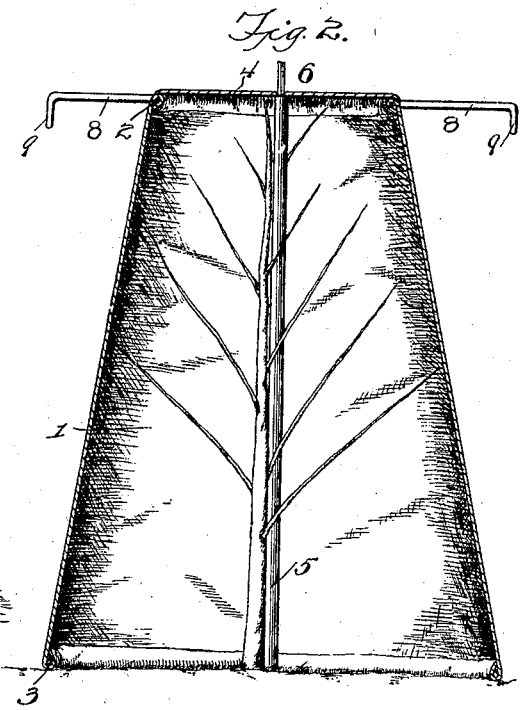
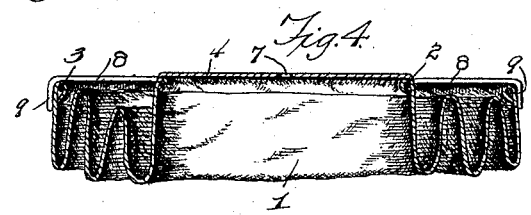
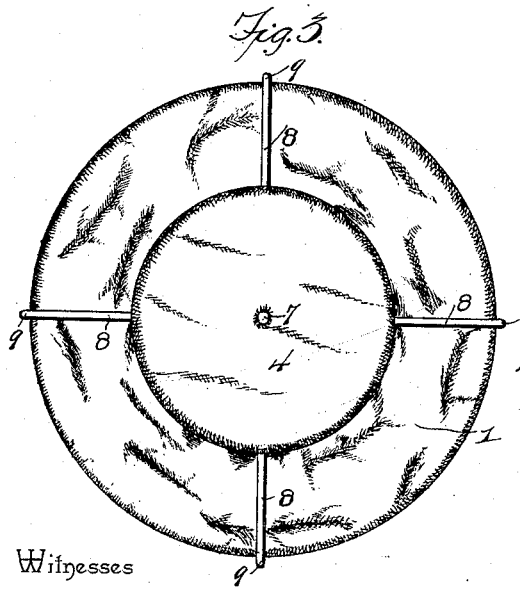
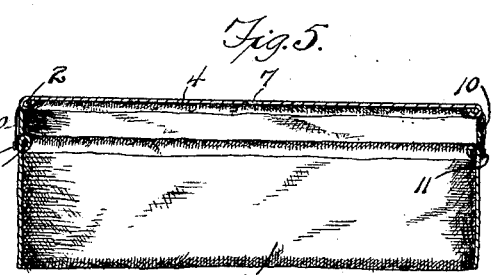
Witnesses
Ralph A. Shepard
W. L. Morris Inventor
By his Attorneys,
C. A. Snow & Co.

UNITED STATES PATENT OFFICE.

WILLIAM LEE MORRIS, OF BARTOW, FLORIDA.

TREE OR PLANT PROTECTOR.

SPECIFICATION forming part of Letters Patent No. 633,528, dated September 19, 1899.

Application filed April 1, 1899. Serial No. 711,439. (No model.)

*To all whom it may concern:*

Be it known that I, WILLIAM LEE MORRIS, a citizen of the United States, residing at Bartow, in the county of Polk and State of Florida, have invented a new and useful Tree or Plant Protector, of which the following is a specification.

This invention relates to plant and tree protectors of that class that envelop the tree or plant to protect it from the effects of the weather, either heat, cold, or moisture.

The object thereof is to provide a collapsible device which may be folded in order that the same may be elevated above the tree and then unfolded, so as to drop down and completely envelop the tree.

A further object is to provide means whereby the device may be held folded or collapsed during the operation of elevating the device above the tree.

To these ends the present invention consists in the combination and arrangement of parts, as will be hereinafter more fully described, shown in the accompanying drawings, and particularly pointed out in the appended claims.

In the drawings, Figure 1 is a perspective view of the device. Fig. 2 is a longitudinal sectional view thereof. Fig. 3 is a top plan view of the device collapsed or folded and showing the manner of connecting the hoops together. Fig. 4 is a transverse sectional view. Fig. 5 is a detail view showing a modified form of connection between the hoops.

Corresponding parts are designated by like reference characters in all the figures of the drawings.

Referring to the accompanying drawings, the body 1 of the device is made of canvas or other flexible material having a general cylindrical shape, preferably smaller in diameter at the top than at the bottom or in the form of a truncated cone. The upper edge of the body is provided with a hoop or band 2, and a similar hoop 3 is provided in the lower edge, the canvas being sewed or otherwise connected to the hoops. A suitable cover 4, preferably of the same material as used for the body, is stretched across the upper hoop; but the bottom of the body is left open to facilitate the application of the device.

In applying the device a pole 5, having a pin 6 provided in the upper end, is thrust upward through the branches of a tree, as near to the trunk as possible, until the top of the pole extends above the top of the tree, the bottom of the pole resting upon the ground. The protector is then collapsed or folded, as illustrated in Fig. 4, and is carried in its folded position to the top of the tree by the employment of a ladder. The cover 4 of the protector is provided with a central opening 7, with which the pin 6 in the top of the pole is engaged, and then the bottom hoop 3 is dropped to the ground, whereby the body of the device is unfolded and envelops the tree. The pole supports the cover above the top of the tree, and the hoops distend the same, so as to completely surround the entire tree and protect the latter.

As the upper hoop is smaller than the lower hoop, it is necessary to connect the two together when carrying the device to the top of a tree and engaging it with the pin in the supporting-pole. In order that this connection may be had, the upper and smaller hoop is provided with a plurality of external radial arms 8, having the hooked outer ends 9. When the device is folded, the arms are adapted to rest upon the lower hoop, so as to prevent the smaller hoop from falling downward through the larger bottom hoop, and the hooked ends of the arms are adapted to prevent the smaller hoop from being accidentally moved laterally, which movement might disengage the arms from the larger hoop and permit the smaller hoop to fall therethrough. The device is carried by the lower larger hoop when placing it in position, and after the cover has been engaged with the pole the larger hoop is released, which is free to drop to the ground, as hereinbefore described. The radial arms 8, with their hooked ends, provide locking devices for holding the hoops together in their collapsed or folded position in applying the protector to a plant or tree.

It will be understood that in some instances it may be desirable to have the hoops of the same size, and to meet such a condition I have provided a modified form of connection for the hoops, as illustrated in Fig. 5.

At preferably diametrically opposite points of the upper hoop there are provided flexible connections or cords 10 and at corresponding points of the lower hoop are provided suitable buttons, cleats, or equivalent devices 11. After the device has been folded the cords are twisted about or engaged with the buttons 11, whereby the two hoops are effectively connected together. The device can then be elevated above the tree, and then the cords or flexible connections are released from the buttons and the bottom hoop is free to be dropped.

The present device provides an exceedingly useful and effective protector against the effects of the weather and may be used to fumigate and destroy insects, as will be understood.

Changes in the form, proportion, size, and the minor details of construction within the scope of the appended claims may be resorted to without departing from the spirit or sacrificing any of the advantages of the present invention.

Having thus described my invention, what is claimed is—

1. A tree and plant protector, comprising opposite upper and lower hoops or bands, flexible sides connecting the hoops and forming a collapsible structure, a cover for the upper end of the device, and locking devices for holding the hoops together in their collapsed or folded position to apply the protector to the plant or tree, and a support therefor when in its operative position, substantially as and for the purpose set forth.

2. A tree and plant protector, comprising upper and lower hoops or bands, flexible sides connecting the hoops and forming therewith a collapsible structure, a cover provided upon the upper hoop, radial arms carried by one of the hoops and adapted to engage the other hoop, whereby the hoops may be held together in their collapsed or folded position, and a support for the device in its operative position, substantially as and for the purpose set forth.

3. A tree and plant protector, comprising opposite upper and lower hoops, the upper hoop being smaller in diameter than the lower hoop, flexible sides connecting the hoops, and a cover fitted to the upper hoop, the entire device being collapsible, external radial hooked arms provided upon the smaller hoop and adapted to rest upon the lower larger hoop in the collapsed or folded position of the device, and a support for the device in its operative position, substantially as and for the purpose set forth.

In testimony that I claim the foregoing as my own I have hereto affixed my signature in the presence of two witnesses.

WILLIAM LEE MORRIS.

Witnesses:
ORANGE POUND,
DOUGLAS E. FREEMAN.